United States Patent
Rochefort et al.

(10) Patent No.: US 6,743,483 B2
(45) Date of Patent: Jun. 1, 2004

(54) METHOD FOR MANUFACTURING A FOAM PANEL

(75) Inventors: Malcolm Rochefort, Co Cavan (IE); Thomas McCabe, Co Cavan (IE)

(73) Assignee: Kingspan Research and Developments Limited, Kingscourt (IE)

( * ) Notice: Subject to any disclaimer, the term of this patent is extended or adjusted under 35 U.S.C. 154(b) by 0 days.

(21) Appl. No.: 09/764,364

(22) Filed: Jan. 19, 2001

(65) Prior Publication Data

US 2001/0012560 A1 Aug. 9, 2001

Related U.S. Application Data

(63) Continuation of application No. PCT/IE99/00065, filed on Jul. 15, 1999.

(30) Foreign Application Priority Data

Jul. 21, 1998 (IE) .................................................. 980600

(51) Int. Cl.[7] .............................. B05D 1/04; B05D 1/38
(52) U.S. Cl. ........................ 427/483; 427/485; 427/244; 427/264; 427/265; 427/289
(58) Field of Search ................................ 427/243, 244, 427/289, 475, 482, 483, 485, 420, 428, 261, 265, 471, 421, 264, 271, 277; 264/46.2, 45.8, 48

(56) References Cited

U.S. PATENT DOCUMENTS

| | | | |
|---|---|---|---|
| 3,657,036 A | 4/1972 | Mullenhoff et al | 156/79 |
| 4,222,722 A | 9/1980 | Bokelmann | 425/89 |
| 4,254,177 A * | 3/1981 | Fulmer | |
| 4,255,105 A | 3/1981 | Hoffmann et al. | 425/144 |
| 4,336,089 A | 6/1982 | Asperger | 156/152 |
| 4,522,004 A | 6/1985 | Evans et al. | 52/409 |
| 4,572,865 A | 2/1986 | Gluck et al. | 428/309.9 |
| 4,877,554 A | 10/1989 | Honma et al. | 252/511 |
| 5,219,629 A | 6/1993 | Sobolev | 428/35.9 |
| 5,352,510 A | 10/1994 | Laughlin et al. | 428/304.4 |
| 5,713,165 A | 2/1998 | Erwin | 52/181 |
| 5,738,907 A * | 4/1998 | Vaccaro et al. | |
| 6,117,375 A | 9/2000 | Garrett et al. | 264/46.2 |

FOREIGN PATENT DOCUMENTS

| | | |
|---|---|---|
| DE | 2246185 | 4/1974 |
| DE | 3112883 A1 | 1/1983 |
| DE | 3125839 A1 | 1/1983 |
| EP | 0831185 A2 | 3/1998 |
| GB | 1048845 | 11/1966 |
| WO | WO96/21564 | 7/1964 |
| WO | WO91/10023 | 7/1991 |

OTHER PUBLICATIONS

Patent Abstracts of Japan, vol. 1995, No. 3, Apr. 28, 1995 & JP 06 337093 A (Matsushita Refrig Co LTD), Dec. 6, 1994.

* cited by examiner

*Primary Examiner*—Fred J. Parker
(74) *Attorney, Agent, or Firm*—Jacobson Holman PLLC

(57) ABSTRACT

An insulated foam board is manufactured by leading a first facing from a reel and laying down liquid foam reactants. A second facing from a supply reel is laid over the reactants forming a sandwich. The foam is expanded in an oven and the board is cut to a desired length. One or both facings are removed and re-wound onto a reel for re-use. A coating in the form of a metallized paint is applied in-line to one or both faces of the foam core, after removal of the facings. The painted boards have enhanced heat insulation properties.

18 Claims, 1 Drawing Sheet

METHOD FOR MANUFACTURING A FOAM PANEL

This application is a con of Ser. No. PCT/IE99/00065 filed on Jul. 15, 1999.

INTRODUCTION

The invention relates to insulated board and in particular to a method for manufacturing a foam panel.

In conventional reactive foam panel manufacture a first facing is delivered to an area at which liquid foam reactants are delivered onto the first facing. A second facing is led over the liquid foam reactants. The foam is then heated and allowed to rise to a predetermined height.

Such manufacturing processes are widely used and are generally successful. There is however an increasing need to maintain competitiveness by reducing manufacturing costs whilst producing a high quality board.

This invention is therefore directed towards producing an improved manufacturing process of this type.

STATEMENTS OF INVENTION

According to the invention there is provided a method for manufacturing a foam panel comprising the steps of:

leading a first facing from a first facing supply to a foam lay down area;

laying liquid foam reactants on the first facing;

leading a second facing from a second facing supply over the liquid foam reactants;

allowing the foam to expand between the facings to form a foam panel;

removing at least one of the facings from the foam; and applying a coating to one or both faces of the foam from which the facings have been removed.

Most preferably the coating is applied in-line. The coating is preferably in a liquid form. Preferably the coating is a paint. In one case the paint contains non-gas permeable flake-like particles or platelets such as metal or glass flakes. The paint may contain aluminium flakes.

In a preferred embodiment the paint contains nanocomposites.

In one embodiment the coating is applied by a calendering roll.

Alternatively or additionally the coating is applied by passing the panel with the facings removed through a curtain of the coating material.

Alternatively or additionally the coating is applied by spray coating.

Alternatively the coating is applied electrostatically.

In a particularly preferred embodiment of the invention the method includes the step, after applying the coating, of curing the coating on the foam. Preferably the curing is carried out in-line.

Most preferably, the coating is cured by heating and/or by application of radiation.

The coating may be cured by localised application of heat and/or radiation.

In one arrangement the method includes the step after coating, of passing the coated panels through an accumulator.

The method may include the step, before or after coating, of turning the panel to lie on an edge thereof.

Ideally the method includes the step, after coating, of cutting the panel to a desired length.

Preferably the method includes the step, after at least partial curing of the coating, of cutting the panel to a desired length.

The paint may be a leafing or non-leafing paint.

Ideally the coating is of low gas permeability, especially to $CO_2$, $O_2$, $N_2$ and/or $H_2O$.

In one embodiment of the invention both facings are removed from the foam for re-use.

In a preferred arrangement one or both facings is/are peeled from the foam and coiled onto a take-off reel for re-use either as the first or second facing supply.

Typically the upper facing is coiled onto an upper facing recycle coil to provide a facing supply for the second facing. Preferably the upper facing recycle coil is delivered to a second facing feeding station. Preferably the lower facing is coiled onto a lower facing recycle coil to provide a facing supply for the first facing. Typically the lower facing recycle coil is delivered to a first facing feed station.

In a preferred embodiment of the invention the first and/or second facings are removed from the foam core after at least partial curing of the foam core.

Ideally, the first and/or second facings are removed from the core in advance of cutting of the foam to a desired length.

In one arrangement release means is provided between the inner face of the first and/or second facing and the foam core. Typically the release means is provided on the inner face of the first and/or second facing.

In one embodiment of the invention the first and/or second facing is selected from:

polyolefin films (such as polypropylene, high or medium density polyethylene, low or linear low density polyethylene), poly halogenated polyolefins (such as polytetrafluoro ethylene), waxed paper and waxed plastic films, other suitably treated paper, plastic, metal foil or glass films and facings and combinations thereof such that the facing can be continuously removed from the foam without significant damage to either facing or foam during or just following the production process.

The foam is preferably selected from polyurethane, polyisocyanurate and phenolic.

Preferably the foam has significant cellular structure for use in thermal and/or acoustic insulation applications.

The invention further provides a foam panel whenever manufactured by a method of the invention. The panel is free from a facing on one or both faces thereof. At least one of the faces of the panel is coated with a coating material, preferably a paint.

The invention also provides a foam panel comprising a foam core having a first face and a second face, at least one of the faces having a coating applied thereto. Preferably the coating is a paint. Most preferably the foam core is of polyurethane, polyisocyanurate or phenolic material.

The panel may for example, be used as an underfloor insulation panel. Alternatively the panel may be an insulation liner panel, for example for use in refrigeration applications such as for a refrigerated transport vehicle.

BRIEF DESCRIPTION OF DRAWING

The invention will be more clearly understood from the following description thereof given by way of example only with reference to the accompanying drawing which is a schematic side view of a method for manufacturing a panel according to the invention.

DETAILED DESCRIPTION

Figure 1:
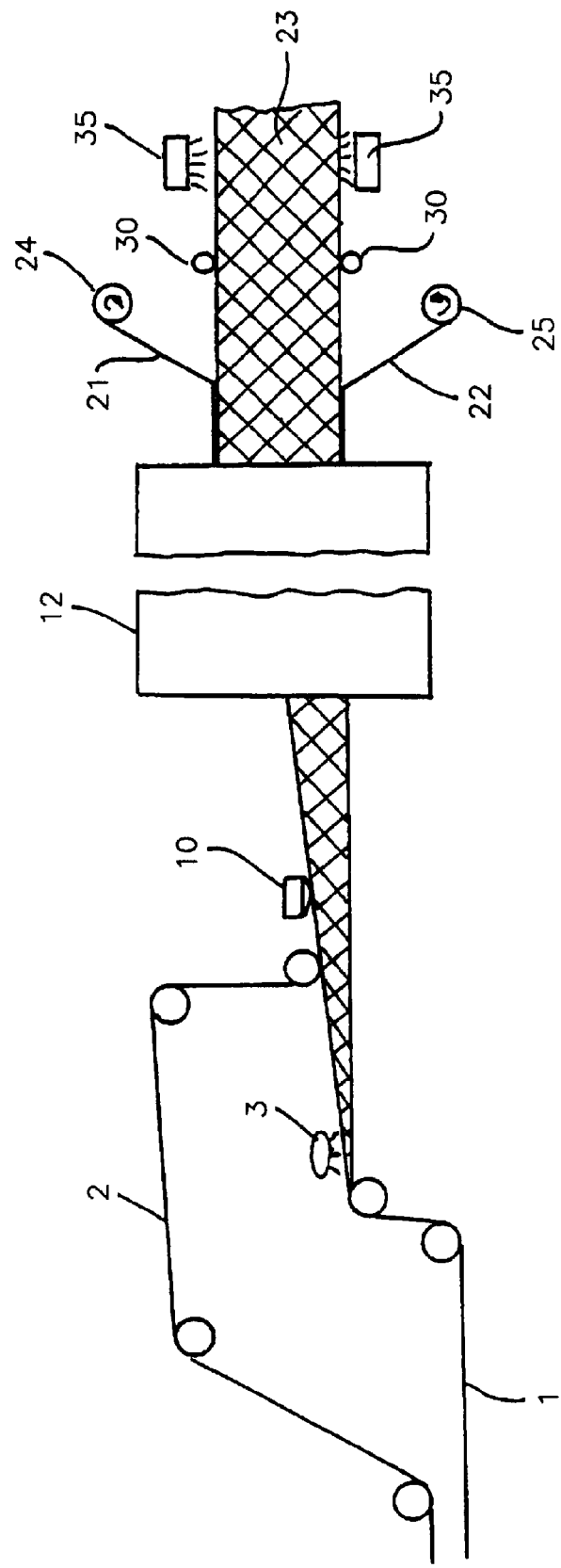

This invention provides a highly cost efficient method for manufacturing an insulated foam board or panel. As in conventional processes, a first facing 1 is led from a supply reel to a foam lay down area and liquid foam reactants are laid down from a lay down head 3 and spread across the facing 1. A second facing 2 from a second facing supply reel is laid down over the liquid foam reactants forming a sandwich. The sandwich may be passed through a nipping means 10 to evenly spread and to set the thickness of the foam. The sandwich is then passed through an oven 12 in which the foam expands under a free or controlled rise technique. The output from the oven 12 is a continuous length of panel comprising outer and inner facings 21, 22 with a foam core 23 therebetween.

In the invention at least one of the facings 21, 22 is removed from the panel and preferably re-wound onto a reel 24, 25 for re-use. Preferably, both of the facings 21, 22 are separately removed from the core 23 and re-wound onto separate reels for re-use as illustrated.

A coating is applied in-line to one or both faces of the foam 23 after removal of the facing(s) 21, 22. The coating is a paint, containing a non-gas permeable flake-like particles or plateletes such as metal or glass flakes. The paint may be an aluminium flaking or non-flaking paint or a nano-composite. Such paint coatings provide a barrier to provide low gas permeability. Thus, the panels are resistant to $CO_2$ permeating from within the cells of the foam and from air permeating in. The net effect of the painting of the foam faces is to substantially maintain the thermal conductance or $\lambda$ value of the foam over prolonged periods of use. Thus, such paints provide a gas barrier to reduce gas transfer between the cells of the foam when exposed to atmospheric conditions and hence provide improved aged thermal conductivity properties. This is especially important for polyurethane and polyisocyanurate foams, and, to a lesser extent, for phenolic foams.

The paint may be formulated to have specific properties. For example the paint may be fire resistant. The paint is preferably applied in-line just after facing removal. The application rate is at least 0.5 g/m$^2$ and is preferably 10 to 50 g/m$^2$. The upper limit will be determined by the application and the economics of the process.

The paint may be applied by passing the panel between calendering rollers 30 to apply paint to both faces. Alternatively the foam panel may be passed through a curtain of paint, for application. The paint may also be sprayed onto one or both faces by spray heads 35.

Electrostatic techniques may also be used to apply the paint. For example, the frame along which the foam passes may be charged to repel paint which is consequently preferentially attracted to the faces of the foam.

After coating, the paint is cured. For example, a localised heat or radiation source may be applied in the form of a directed hot air source, an IR source, a UV source, a microwave source or the like. The foam may also be cured in an oven. To provide additional curing time, in-line, the panel may be passed through an accumulator.

To assist coating and/or curing the panel may be turned on edge.

Ideally, the facings 21, 22 are removed when the panel exits the oven 12 and in advance of cutting. Alternatively, it may be possible to remove the facings 21, 22 from the panel as the panel passes through the oven 12. The removal within the oven would be at a stage where the foam has sufficiently cured but before final cooling as one or both facings may be more easily removed at this stage. Indeed, both facings may not have to be removed at the same stage.

The re-wound removed facings 21, 22 are coiled and the coils 24, 25 may then be re-used at the infeed either as a first or second facing. If desired, the facing may be reversed for re-use and/or a cleaning means may be provided for the collected facing before re-use.

To facilitate removal one or both facings may be treated with a release means on the foam-engaging face of the facing. For example, silicone or wax may be applied.

In order to improve facing removal, preferably the outer foam layers are not corona treated.

EXAMPLE 1

A typical foam formulation which may be used in the process of the invention is as follows:

|  | pph polyol (by wt) |
| --- | --- |
| Polyester polyol | 70 |
| Polyether polyol | 30 |
| Silicone surfactant | 2 |
| Dimethylcyclohexylamine | 0.6 |
| Potassium acetate in monoethyleneglycol | 3.0 |
| Water | 1.3 |
| 141 b | 34 |
| Crude diphenyl isocyanate (MDI) (e.g. Suprasec 2085 supplied by ICI) | 214 |
| Fire Retardant | 10 |

The foam preferably has a significant cellular structure for use in thermal and/or acoustic insulation applications. The foam is preferably polyurethane, polyisocyanurate, or phenolic.

The first and/or second removable facings are typically selected from:

polyolefin films (such as polypropylene, high or medium density polyethylene, low or linear low density, polyethylene), poly halogenated polyolefins (such as polytetrafluoro ethylene), waxed paper and waxed plastic films, other suitably treated paper, plastic, metal foil or glass films and facings and combinations thereof such that the facing can be continuously removed from the foam without significant damage to either facing or foam during or just following the production process.

For example, the facing may be of polypropylene or a silicone treated polyethylene terephthalate (PET) film material.

EXAMPLE 2

An insulation board was produced using a conventional fixed-gap polyurethane foam laminator. The precursors were prepared as components A and B in the ratios shown below (parts by weight per hundred parts total reactive polyol). A and B were then mixed at high pressure (>100 bar g) in an impingement mixer and laid down onto the lower facings. This facing consisted of polypropylene film of 50 $\mu$m thickness. The lay-down method was a conventional oscillating gas-poker giving an approximately even spread of foam pre-polymer across the width of the board. Density of the foam was targeted at 32 kg/m$^3$.

Composition of pre-polymer: (parts by weight)

|  | Component A | Component B |
| --- | --- | --- |
| Polyester Polyol Mix | 100 |  |
| Fire Retardant | 10 |  |
| Silicone Surfactant | 1.5 |  |

-continued

|  | Component A | Component B |
|---|---|---|
| Water | 0.5 | |
| Potassium acetate in monoethyleneglycol | 1.2 | |
| Dabco TMR (Air Products) | 3.0 | |
| Pentamethyldiethylenetriamine | 0.3 | |
| Dimethylcyclohexylamine | 0.4 | |
| HCFC 141b | 32 | |
| Crude diphenyl isocyanate (MDI) (e.g. suprasec 2086 from ICI) | | 191 |

The upper facing was introduced over the lower as the reacting mix was moved continuously into a conventional fixed gap laminator (set at 60 mm) heated to 45° C. At the exit of the laminator the facings were continuously removed from the board top and bottom, and the solid insulation board cut to size. Board A was left uncoated whilst board C was then sprayed with an aluminised (metal flake) automotive refinish paint [Halford Chrome Finish Paint] both sides. By weight difference, the coating application rate was approximately 35 g/m².

Samples 30 cm square were then cut from boards A and C, these were left for 24 hours at room temperature and the thermal conductivity measured per ISO 8302 (1991) standard for steady-state thermal resistance measurement. The samples were then placed into an oven at 70° C. to accelerate gas-interchange and simulate long term ageing performance. The following data were recorded. All results give $\lambda$ in mW/m.K:

| Time period (from initial) | Sample A (uncoated) | Sample C (painted) |
|---|---|---|
| Initial $\lambda$ (mW/m.K) | 18.0 | 18.2 |
| After 2 weeks | 19.0 | 18.9 |
| 4 weeks | 20.2 | 19.0 |
| 8 weeks | 21.3 | 20.0 |
| 10 weeks | 21.5 | 20.0 |
| 15 weeks | 22.5 | 20.8 |
| 20 weeks | 22.8 | 21.6 |
| 25 weeks | 23.1 | 21.6 |
| Total delta $\lambda$ | 5.1 mW/m.K | 3.4 mW/m.K |

Thus the unexpected effect of the paint is to give an improved aged $\lambda$ result, indicating significant reduction of gas interchange. As it is recognised that 25 weeks at 70° C. can approximate to a 25 year aged result for polyurethane insulation (Ball, Simpson & Fleming, Cellular Polymers, pp. 110–149, volume 16, no. 2, 1997), this equates to a significant improvement in thermal efficiency over the lifetime of the product.

Thus, the invention provides an efficient manufacturing method with significant cost reduction. Because a foam is produced with one or both faces exposed the foam can be readily treated depending on its intended application. For example, for underfloor or wall insulation a paint may be applied to one face. For fire applications, at least one of the faces may be coated with a fire resistant material. Most importantly the coating/painting of one and preferably both faces provides improved aged thermal conductivity properties.

These and many other modifications to the invention will be readily apparent and accordingly the invention is not limited to the embodiments hereinbefore described which may be varied in detail.

What is claimed is:

1. A method for manufacturing a foam panel comprising the sequential steps of:
    leading a first facing from a first facing supply to a foam lay down area;
    laying liquid foam reactants on the first facing in the foam lay down area;
    leading a second facing from a second facing supply over the liquid foam reactants;
    allowing the foam to expand between the first and the second facings to form a foam panel;
    removing at least one of the first and the second facings from the foam panel to expose at least one face of the foam panel; and
    thereafter applying a coating in-line as a paint directly to only the exposed at least one face of the foam panel from which the at least one of the first and the second facings has been removed.

2. A method as claimed in claim 1 wherein the paint contains non-gas permeable particles or platelets including aluminium flakes and nanocomposites.

3. A method as claimed in claim 2 wherein the paint is a leafing or non-leafing paint.

4. A method as claimed in claim 1 wherein the coating is applied by any one or more of the following:
    a calendering roll;
    passing the panel with at least one of the first and the second facing removed, through a curtain of the coating material;
    spray coating; and
    electrostatically.

5. A method as claimed in claim 1 wherein the method includes the step after coating, of passing the coated panels through an accumulator.

6. A method as claimed in claim 1 including the step, before or after coating, of turning the panel to lie on an edge thereof.

7. A method as claimed in claim 1 including the step, after coating of cutting the panel to a desired length.

8. A method as claimed in claim 1 wherein both facings are removed from the foam, with at least one of the facings peeled from the foam panel and coiled onto a take-off reel for re-use.

9. A method as claimed in claim 1 wherein an upper facing is coiled onto an upper facing recycle coil to provide a facing supply for the second facing, and a lower facing is coiled onto a lower facing recycle coil to provide a facing supply for the first facing, the upper facing recycle coil is delivered to a second facing feeding station, and the lower facing recycle coil is delivered to a first facing feeding station.

10. A method as claimed in claim 1 wherein at least one of the first and the second facings are removed from the foam panel after at least partial curing of the foam panel.

11. A method as claimed in claim 1 wherein at least one of the first and the second facings are removed from the foam panel in advance of cutting of the foam panel to a desired length.

12. A method as claimed in claim 1 wherein the foam is selected from polyurethane, polyisocyanurate and phenolic.

13. A method for manufacturing a foam panel comprising the sequential steps of:
    leading a first facing from a first facing supply to a foam lay down area;
    laying liquid foam reactants on the first facing in the foam lay down area;

leading a second facing from a second facing supply over the liquid foam reactants;

allowing the foam to expand between the first and the second facings to form a foam panel;

removing at least one of the first and the second facings from the foam panel to expose at least one face of the foam panel; and thereafter applying a coating directly to only the exposed at least one face of the foam panel from which the at least one of the first and the second facings has been removed;

wherein the coating limits gas permeability by at least one of $CO_2$, $O_2$, $N_2$ and $H_2O$.

14. A method for manufacturing a foam panel comprising the sequential steps of:

leading a first facing from a first facing supply to a foam lay down area;

laying liquid foam reactants on the first facing in the foam lay down area;

leading a second facing from a second facing supply over the liquid foam reactants;

allowing the foam to expand between the first and the second facings to form a foam panel;

removing at least one of the first and the second facings from the foam panel to expose at least one face of the foam panel; and thereafter applying a coating directly to only the exposed at least one face of the foam panel from which the at least one of the first and the second facings has been removed, after applying the coating, curing the coating on the foam panel, carried out in-line, by at least one of heating and by application of radiation, and curing in an oven.

15. A method as claimed in claim 14 including the step, after at least partial curing of the coating, of cutting the panel to a desired length.

16. A method for manufacturing a foam panel comprising the sequential steps of:

leading a first facing from a first facing supply to a foam lay down area;

laying liquid foam reactants on the first facing in the foam lay down area;

leading a second facing from a second facing supply over the liquid foam reactants;

allowing the foam to expand between the first and the second facings to form a foam panel;

removing at least one of the first and the second facings from the foam panel to expose at least one face of the foam panel; and thereafter applying a coating directly to only the exposed at least one face of the foam panel from which the at least one of the first and the second facings has been removed, wherein release means being provided between the inner face of at least one of the first and the second facing and the foam panel, the release means being provided on the inner face at least one of the first and the second facing.

17. A method for manufacturing a foam panel comprising the sequential steps of:

leading a first facing from a first facing supply to a foam lay down area;

laying liquid foam reactants on the first facing in the foam lay down area;

leading a second facing from a second facing supply over the liquid foam reactants;

allowing the foam to expand between the first and the second facings to form a foam panel;

removing at least one of the first and the second facings from the foam panel to expose at least one face of the foam panel; and thereafter applying a coating directly to only the exposed at least one face of the foam panel from which the at least one of the first and the second facings has been removed, wherein the first facing being selected from:
polyolefin films, poly halogenated polyolefins, waxed paper and waxed plastic films, plastic, metal foil and glass films.

18. A method for manufacturing a foam panel comprising the sequential steps of:

leading a first facing from a first facing supply to a foam lay down area;

laying liquid foam reactants on the first facing in the foam lay down area;

leading a second facing from a second facing supply over the liquid foam reactants;

allowing the foam to expand between the first and the second facings to form a foam panel;

removing at least one of the first and the second facings from the foam panel to expose at least one face of the foam panel; and thereafter applying a coating directly to only the exposed at least one face of the foam panel from which the at least one of the first and the second facings has been removed, wherein the second facing being selected from:
polyolefin films, poly halogenated polyolefins, waxed paper and waxed plastic films, plastic, metal foil and glass films.

* * * * *